Nov. 24, 1959     R. C. VICKERY     2,914,380
PRODUCTION OF $Ca(H_2PO_4)_2$
Filed April 4, 1956
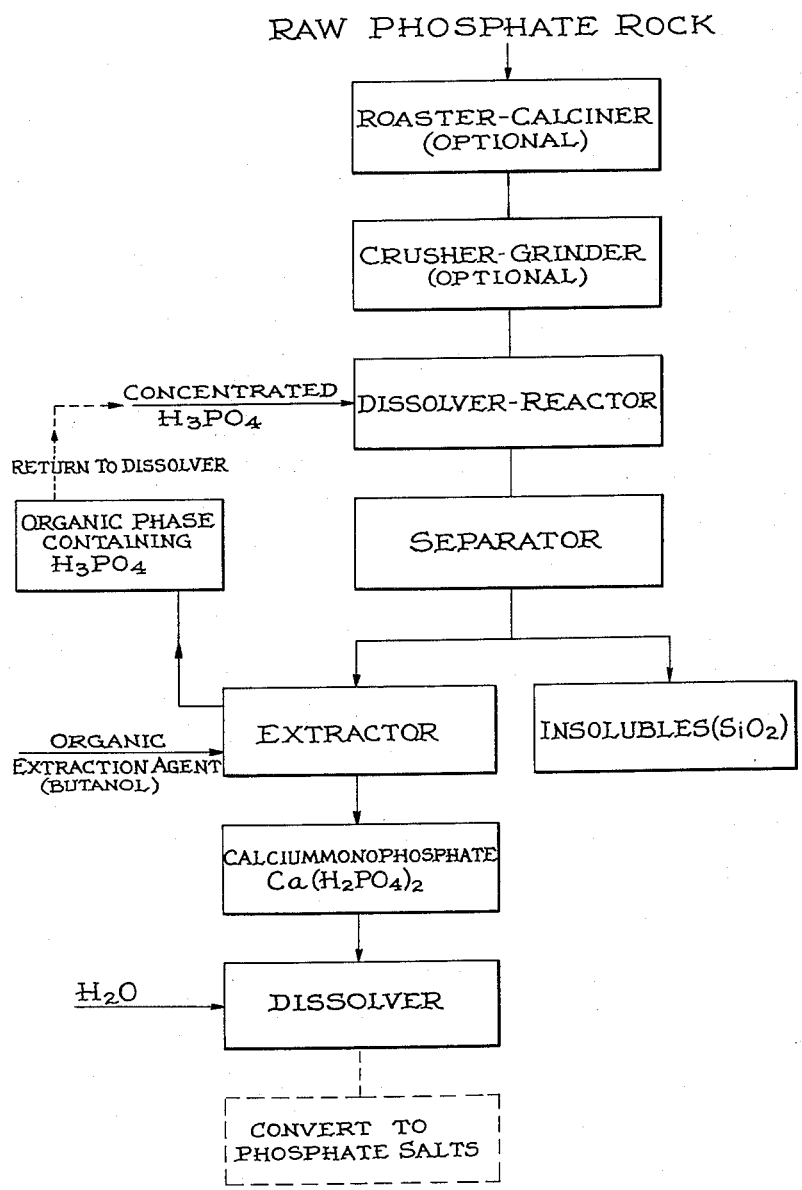
INVENTOR
RONALD C. VICKERY
BY Lawrence J. Field
ATTORNEY

United States Patent Office 2,914,380
Patented Nov. 24, 1959

2,914,380

PRODUCTION OF Ca(H₂PO₄)₂

Ronald C. Vickery, Cleveland, Ohio, assignor to Horizons Incorporated, Princeton, N.J., a corporation of New Jersey Application April 4, 1956, Serial No. 575,942

11 Claims. (Cl. 23—109)

This invention relates to a process for producing monocalciumorthophosphate $Ca(H_2PO_4)_2$ from crude naturally occurring phosphate material or from phosphatic by-product materials and further relates to the production of other phosphates in pure form from the monocalciumorthophosphate so produced, and more particularly to the ultimate production of the dihydrogen phosphates of the alkali metals and ammonium and the ultimate production of the normal phosphates of the various metals such as the alkali metals, including ammonium, iron, copper, cobalt, aluminum and the like, any of which are obtained by simple metathetical reactions involving the monocalciumorthophosphate produced in an earlier stage of my process.

In a copending application, Serial No. 561,680, filed January 26, 1956, which issued as U.S. Patent 2,899,282 on August 11, 1959, I disclosed a process in which crude phosphate material was treated with the equivalent of a minimum of 1.8 times its weight of 85% strength phosphoric acid to produce a water soluble product which separated readily from any insoluble residual siliceous material in the phosphate starting material. As disclosed therein the concentration of the phosphoric acid employed for the treatment of the crude phosphate-containing material may lie between 60% $H_3PO_4$ and 100% $H_3PO_4$, acid of 85% $H_3PO_4$ content being that preferred for the process. The solution was then reacted with an acid from the group consisting of sulphuric, boric and hydrofluoric and an alkali metal or an ammonium salt of said acid. The alkaline earth salt of the added acid precipitates and the alkali or ammonium dihydrogen phosphate is recovered from the solution.

In accordance with the present invention, the crude phosphate material is treated with phosphoric acid in the same manner as that disclosed in my earlier application to produce a product which, except for silica and possibly small amounts of other impurities, is completely soluble in water. Preferably the phosphate rock is roasted and the roasted product is ground to minus 100 mesh (Tyler standard) particle size before being treated with about twice its weight of concentrated phosphoric acid. The reaction is allowed to proceed for about 2 hours at temperatures between 110 and 135° C., preferably between 125° C. and 135° C., after which the product is dissolved in a sufficient amount of water to form a clear liquid which can be readily decanted from the insolubles. Instead of reacting the liquid, as in my earlier application, I have now found that substantially pure monocalciumorthophosphate may be recovered from the solution by a relatively simple technique and that other derivatives of phosphoric acid may be produced from the monocalciumorthophosphate.

The dilute solution is contacted with a large excess of an organic extraction agent, e.g. butanol, or other organic solvents, such as those described in U.S. Patents 1,929,441 and 1,929,442. The butanol extracts the phosphoric acid from the solution, and when the phosphoric acid concentration in the aqueous phase has been sufficiently diminished, the monocalciumorthophosphate precipitates. In this manner the various impurities present in amounts from trace to substantial percentages in the crude phosphate material are separated from the calcium phosphate content of the crude phosphate rock by extraction into the butanol layer or by remaining in the aqueous solution.

The single sheet of drawings accompanying the specification comprises a flow sheet representative of the foregoing procedure for treating crude phosphate rock to obtain an aqueous solution of monocalcium orthophosphate which may be processed further to convert it to other phosphate salts.

Once the monocalciumorthophosphate has been produced, it is readily converted to any of a number of valuable by-products. For example, the alkali metal dihydrogen phosphates, tricalcium phosphate and trisodium phosphate are all valuable chemicals of commerce in the present economy as water treating agents, animal feed and detergents respectively. To produce the dihydrogen phosphates of an alkali metal or ammonium, a metathetical reaction is effected in solution between monocalciumorthophosphate and an appropriate salt of the alkali metal in approximately stoichiometric amounts. Preferably, the alkali metal or ammonium salt is one whose anion forms an insoluble compound with the calcium, e.g. the sulphate or carbonate, whereby the calcium carbonate or sulphate formed is effectively removed from the system and tends to give a virtually complete reaction along the following lines:

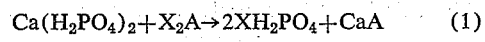

$$Ca(H_2PO_4)_2 + X_2A \rightarrow 2XH_2PO_4 + CaA \qquad (1)$$

where X is a member of the group consisting of the alkali metals and $NH_4^+$ and A is a member of the group $SO_4^=$ and $CO_3^=$.

To prepare normal phosphates such as trisodium phosphate from the monocalciumorthophosphate a similar reaction may be effected with somewhat higher concentrations of alkali metal or ammonium ion, reversion of the normal phosphate to acid phosphate being prevented by neutralization or removal of the acid $H_2A$. Thus, the reaction above is modified to provide three moles of alkali metal or ammonium for each mole of monocalciumorthophosphate, the reaction being represented

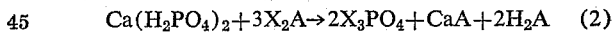

$$Ca(H_2PO_4)_2 + 3X_2A \rightarrow 2X_3PO_4 + CaA + 2H_2A \qquad (2)$$

where X and A are as above.

To produce phosphates of various metals such as iron, copper, cobalt or aluminum, a similar system is employed except that in these instances the reaction may be carried out to produce either insoluble calcium salts and soluble phosphates or soluble calcium salts and insoluble phosphates. The latter type is illustrated below as chloride and the former type is illustrated below as carbonate, although other anions may be used in the reactions. The reactions which follow are typical of those employed to produce the phosphates of many other metals:

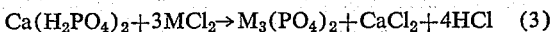
$$Ca(H_2PO_4)_2 + 3MCl_2 \rightarrow M_3(PO_4)_2 + CaCl_2 + 4HCl \qquad (3)$$
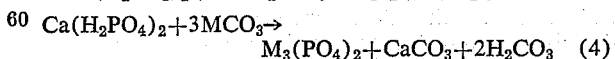
$$Ca(H_2PO_4)_2 + 3MCO_3 \rightarrow M_3(PO_4)_2 + CaCO_3 + 2H_2CO_3 \qquad (4)$$
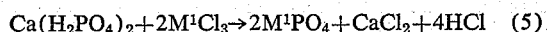
$$Ca(H_2PO_4)_2 + 2M^1Cl_3 \rightarrow 2M^1PO_4 + CaCl_2 + 4HCl \qquad (5)$$
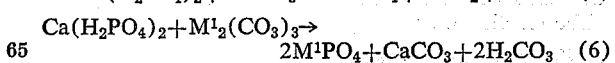
$$Ca(H_2PO_4)_2 + M^1{}_2(CO_3)_3 \rightarrow 2M^1PO_4 + CaCO_3 + 2H_2CO_3 \qquad (6)$$

where M and $M^1$ are respectively divalent or trivalent metals such as iron, copper, aluminum.

Where the carbonate is used and $H_2CO_3$ is one of the reaction products, it may be removed from the system by simply heating the solution whereby it is decomposed and carbon dioxide passes off.

The following examples will serve to further illustrate the nature of my invention and are to be taken as illustrative and not by way of limitation thereof.

Example 1
PREPARATION OF Ca(H$_2$PO$_4$)$_2$

One hundred parts by weight of phosphate rock whose analysis (on an oxide basis) was about 48% by weight CaO, 33% P$_2$O$_5$, 8% silica, 4% alumina, 1.5% iron oxides, and the remainder, various ingredients in small amounts, was roasted to remove organic material present in the rock deposit. The roasted material was crushed to minus 100 mesh (Tyler standard) and then digested with about twice its weight of 85% phosphoric acid at 125° C., for about 2 hours. The digested mass was poured into a weight of water about equal to the weight of the mass, which proved to be sufficient to dissolve the entire mass except for a residue of silica, amounting to about 6% of the original rock. The silica was separated from the solution by decantation and filtration. The filtrate was shaken with between at least about 3.5 and 4 times its volume of butyl alcohol, thereby extracting the phosphoric acid from the solution. A white readily filterable precipitate of monocalciumorthophosphate, Ca(H$_2$PO$_4$)$_2$ formed. The monocalciumorthophosphate was separated from the liquids by filtration, redissolved in water and this watery solution was used in the following examples. After separation from the aqueous phase, the butanol phase was washed with water to recover the phosphoric acid and the butanol separately for reuse in the process.

Example 2
PREPARATION OF Na$_3$PO$_4$

Hot solutions of monocalciumorthophosphate,

Ca(H$_2$PO$_4$)$_2$ and sodiumsulphate (Na$_2$SO$_4$) were prepared separately by dissolving 100 parts by weight of the former and 182 parts by weight of the latter in separate bodies of water. The hot solutions were then mixed while hot and the mixture was digested at about 80° C., with stirring, for several minutes. A white precipitate formed almost immediately which was identified as calcium sulphate (CaSO$_4$). After the reaction $$Ca(H_2PO_4)_2 + 3Na_2SO_4 \rightarrow 2Na_3PO_4 + \overline{CaSO_4} + 2H_2SO_4 \quad (7)$$

was completed, the hot mixture was filtered and most of the calcium sulphate was separated from the solution. The filtrate was extracted with butyl alcohol to separate the sulphuric acid therefrom. The extracted aqueous raffinate was evaporated, yielding 213 parts by weight of a solid analyzing 29.7% Na, 30.2% PO$_4$, 40.2% SO$_4$ and 1.22% Ca. The solid was redissolved in hot water and on recrystallization 150 parts by weight of trisodium phosphate were separately recovered as a substantially pure compound.

Example 3
PREPARATION OF (NH$_4$)$_3$PO$_4$

Warm solutions containing 100 parts by weight of monocalciumorthophosphate and 123 parts by weight of ammonium carbonate were mixed and heated to the boiling point. After the reaction below was completed, the mixture was boiled for several minutes to expell excess carbonic acid. Crystallization of the mother liquor produced about 50% of the theoretical yield of (NH$_4$)$_3$PO$_4$.
The reaction was:

$$Ca(H_2PO_4)_2 + 3(NH_4)_2CO_3 \quad (8)$$
$$\rightarrow 2(NH_4)_3PO_4 + \overline{CaCO_3} + 2H_2CO_3$$

Example 4
PREPARATION OF K$_3$PO$_4$

The procedure of Example 2 was repeated except that solid potassium carbonate was added to the heated solution of monocalciumorthophosphate. After filtering off the precipitate of calcium carbonate, the solution was evaporated to yield 192 parts by weight of a product analyzing: K—50.3%, PO$_4$—27.9%, CO$_3$—13.2%, Ca—nil. The reaction being considered incomplete, the product was redigested with mother liquor to yield a product analyzing: K—53.5%, PO$_4$—43.2% which corresponds to relatively pure anhydrous K$_3$PO$_4$.
The reaction:

$$Ca(H_2PO_4)_2 + 3K_2CO_3 \rightarrow 2K_3PO_4 + \overline{CaCO_3} + \overline{2H_2CO_3} \quad (9)$$

Example 5
PREPARATION OF FePO$_4$

A solution containing 100 parts by weight of monocalciumorthophosphate was mixed with 231 parts by weight of ferric chloride in solution. After digestion at about 80° C., the excess acid was neutralized by the addition of a base to produce a solution with a pH of about 6. About 176 parts by weight of a product containing some calcium and chloride was obtained (analysis Ca—1.36%, Cl—8.11%, Fe—28.2%, PO$_4$—46.1% by weight). Further digestion of the phosphate precipitate yielded a product, the analysis of which corresponded to FePO$_4$·2H$_2$O, in almost quantitative yield according to the reaction:

$$Ca(H_2PO_4)_2 + 2FeCl_3 \rightarrow 2FePO_4 + CaCl_2 + 4HCl \quad (10)$$

Example 6
PREPARATION OF Co$_3$(PO$_4$)$_2$

The procedure of Example 5 was repeated except that 305 parts by weight of cobaltous chloride were added to 100 parts by weight of the monocalciumorthophosphate. Again the presence of HCl prevented the complete precipitation of cobalt phosphate but on adjusting the pH to about 6, a yield of 182 parts by weight of Co$_3$(PO$_4$)$_2$·8H$_2$O was obtained, the reaction being:

$$Ca(H_2PO_4) + 3CoCl_2 \rightarrow Co_3(PO_4)_2 + CaCl_2 + 4HCl \quad (11)$$

Similar experiments have been performed with sodium, potassium, ammonium, iron, cobalt, copper and aluminum cations and sulphate, chloride and carbonate anions, in various combinations, whereby normal and acid phosphates similar to those obtained in the enumerated examples have been obtained.

It will be recognized that to obtain a satisfactory yield of the phosphate in many instances, the pH of the reaction mixture may require adjustment. When one of the products is H$_2$CO$_3$, merely boiling the solution to eliminate CO$_2$ will effect an adjustment of pH as in Example 3. In other instances, either the addition of free base, e.g. as CaO (Example 5) or the removal of the excess acid by extraction with a suitable solvent, e.g. butanol (Example 2) have been illustrated to effect the adjustment of the pH as required. It is also possible to add a free metal, such as iron to react with the excess acid.

As many apparently widely different embodiments of this invention may be made without departing from the spirit and scope thereof, it is to be understood that this invention is not limited to the specific embodiments thereof except as defined in the appended claims.

I claim:

1. A method of producing monocalciumorthophosphate from a crude material containing tricalcium phosphate which comprises reacting the crude material with an amount of H$_3$PO$_4$ equal to that present in at least about 1.8 times its weight of 85% phosphoric acid, said acid having a strength of between 60% H$_3$PO$_4$ and 100% H$_3$PO$_4$ and said treatment being at a temperature of between about 110° C. and 135° C. for two hours; dissolving the reaction product in water; extracting the phosphoric acid from the water solution so produced by means of an excess of an organic extraction agent in which phosphoric acid dissolves, thereby removing phosphoric acid and thereby concurrently precipitating monocalcium orthophosphate from the aqueous solution; separating the monocalciumorthophosphate which is precipitated as the phosphoric acid is extracted and recovering the monocalcium phosphate ($Ca(H_2PO_4)_2$) so produced.

2. A method of producing monocalciumorthophosphate from a crude material containing tricalcium phosphate which comprises reacting the crude material with an amount of $H_3PO_4$ equal to that present in at least about 1.8 times its weight of 85% phosphoric acid said acid having a strength of between 60% $H_3PO_4$ and 100% $H_3PO_4$ and said treatment being at a temperature of between about 110° C. and 135° C. for two hours; dissolving the reaction product in water; extracting the phosphoric acid from the water solution so produced by means of an excess of an alcohol thereby removing phosphoric acid and thereby concurrently precipitating monocalcium orthophosphate from the aqueous solution; separating the monocalciumorthophosphate which is precipitated as the phosphoric acid is extracted and recovering the monocalcium phosphate ($Ca(H_2PO_4)_2$) so produced.

3. A method of producing monocalciumorthophosphate from a crude phosphate rock material containing tricalcium phosphate, which comprises reacting the crude material with an amount of $H_3PO_4$ equal to that present in at least about 1.8 times its weight of 85% phosphoric acid said acid having a strength of between 60% $H_3PO_4$ and 100% $H_3PO_4$ and said treatment being at a temperature of between about 110° C. and 135° C. for two hours; dissolving the reaction product in water; extracting the phosphoric acid from the water solution so produced by means of an excess of butanol, thereby removing phosphoric acid and thereby concurrently precipitating monocalcium orthophosphate from the aqueous solution; separating the monocalciumorthophosphate which is precipitated as the phosphoric acid is extracted and recovering the monocalcium phosphate ($Ca(H_2PO_4)_2$) so produced.

4. A method of producing monocalciumorthophosphate from a crude material containing tricalcium phosphate which comprises reacting the crude material with an amount of $H_3PO_4$ equal to that present in at least about 1.8 times its weight of 85% phosphoric acid said acid having a strength of between 60% $H_3PO_4$ and 100% $H_3PO_4$ and said treatment being at a temperature of between about 110° C. and 135° C. for two hours; dissolving the reaction product in water; extracting the phosphoric acid from the water solution so produced by means of at least 3.5 times its volume of butanol, thereby removing phosphoric acid and thereby concurrently precipitating monocalcium orthophosphate from the aqueous solution; separating the monocalciumorthophosphate which is precipitated as the phosphoric acid is extracted and recovering the monocalcium phosphate ($Ca(H_2PO_4)_2$) so produced.

5. A method of producing monocalciumorthophosphate from a crude phosphate rock material containing tricalcium phosphate which comprises reacting the crude material with at least about 1.8 times its weight of 85% phosphoric acid at a temperature of about 125° C. for two hours; dissolving the reaction product in water; extracting the phosphoric acid from the water solution so produced by means of an excess of butanol, thereby removing phosphoric acid and thereby concurrently precipitating monocalcium orthophosphate from the aqueous solution; filtering off the monocalciumorthophosphate which is precipitated as the phosphoric acid is extracted and recovering the monocalcium phosphate ($Ca(H_2PO_4)_2$) so produced.

6. A method of producing dihydrogen and normal phosphates of the alkali metals and ammonium which comprises reacting a phosphate rock material containing tricalcium phosphate with at least about 1.8 times its weight of 85% phosphoric acid at an elevated temperature of between 110° C. and 135° C. for about 2 hours; dissolving the reaction product in water; extracting the phosphoric acid in the water solution by means of an organic solvent for phosphoric acid, thereby precipitating monocalciumorthophosphate from the reacted mixture; separating the monocalciumorthophosphate from the liquid phases present; dissolving the monocalcium phosphate in water; reacting the aqueous solution of the moncalciumorthophosphate with a salt of a cation from the group consisting of alkali metal and ammonium cations and an anion from the group consisting of sulphate and carbonate anions, thereby precipitating a water-insoluble calcium salt and forming the desired phosphate in the aqueous solution; separating the water-insoluble calcium salt from the solution and recovering the phosphate by crystallization from the separated solution.

7. A method of producing dihydrogen phosphates of the alkali metals and ammonium which comprises reacting a phosphate rock material containing tricalcium phosphate with at least about 1.8 times its weight of 85% phosphoric acid at an elevated temperature of between 110° C. and 135° C. for about 2 hours; dissolving the reaction product in water; extracting the phosphoric acid in the water solution by means of an organic solvent for phosphoric acid, thereby precipitating monocalciumorthophosphate from the reacted mixture; separating the monocalciumorthophosphate from the liquid phases present; dissolving the monocalcium phosphate in water; reacting the aqueous solution of the monocalciumorthophosphate with an equivalent proportion of a salt of a cation from the group consisting of alkali metal and ammonium cations and an anion from the group consisting of sulphate and carbonate anions, thereby precipitating an insoluble calcium salt and forming the desired phosphate in the aqueous solution; separating the water-insoluble calcium salt from the solution and recovering the phosphate by crystallization from the separated solution.

8. A method of producing normal phosphates of the alkali metals and ammonium which comprises reacting a phosphate rock material containing tricalcium phosphate with at least about 1.8 times its weight of 85% phosphoric acid at an elevated temperature of between 110° C. and 135° C. for about 2 hours; dissolving the reaction product in water; extracting the phosphoric acid in the water solution by means of an organic solvent for phosphoric acid, thereby precipitating monocalciumorthophosphate from the reacted mixture; separating the monocalciumorthophosphate from the liquid phases present; dissolving the monocalcium phosphate in water; reacting the aqueous solution of the monocalciumorthophosphate with a salt of a cation from the group consisting of alkali metal and ammonium cations and an anion from the group consisting of sulphate and carbonate anions, in the proportions of one mol of $Ca(H_2PO_4)_2$:3 mols of the salt thereby precipitating a water-insoluble calcium salt and forming the desired phosphate in the aqueous solution; separating the water-insoluble calcium salt from the solution and recovering the normal phosphate by crystallization from the separated solution.

9. The method of claim 8 in which the salt is a sodium salt and the product is $Na_3PO_4$.

10. A method of producing normal phosphates of the alkali metals and ammonium which comprises reacting a phosphate rock material containing tricalcium phosphate with at least about 1.8 times its weight of 85% phosphoric acid at an elevated temperature of between 110° C. and 135° C. for about 2 hours; dissolving the reaction product in water; extracting the phosphoric acid in the water solution by means of an organic solvent for phosphoric acid, thereby precipitating monocalciumorthophosphate from the reacted mixture; separating the monocalciumorthophosphate from the liquid phases present; dissolving the monocalcium phosphate in water; reacting the aqueous solution of the monocalciumorthophosphate with a salt from the group consisting of alkali metal and ammonium carbonates and sulphates, thereby precipitating a water-insoluble calcium salt, adjusting the pH of the solution to about 6; separating the water-insoluble calcium salt from the solution and recovering the normal phosphate by crystallization from the separated solution.

11. A method of producing an orthophosphate of a metal of the group consisting of aluminum, copper, iron and cobalt which comprises reacting a crude phosphatic material containing tricalcium phosphate with at least about 1.8 times its weight of concentrated phosphoric acid at a temperature of between 110° C. and 135° C. for two hours; dissolving the reaction product in water; extracting the water solution so produced with an excess of an organic extraction agent in which phosphoric acid dissolves, thereby removing phosphoric acid from the aqueous solution, and precipitating monocalciumorthophosphate, separating the monocalciumorthophosphate from the liquid phases present; dissolving the monocalcium phosphate in water; reacting the aqueous solution of the monocalciumorthophosphate with a salt from the group consisting of the chlorides and carbonates of a metal of the group: aluminum, copper, iron and cobalt; adjusting the pH of the reaction mixture to about 6 whereby a precipitate of the metal phosphate is formed, and recovering the metal phosphate from the precipitate.

References Cited in the file of this patent

UNITED STATES PATENTS

| | | |
|---|---|---|
| Re. 19,045 | Larsson | Jan. 16, 1934 |
| 1,929,441 | Milligan | Oct. 10, 1933 |
| 2,567,227 | Miller | Sept. 11, 1951 |
| 2,680,679 | Harvey et al. | June 8, 1954 |
| 2,683,075 | Caldwell | July 6, 1954 |
| 2,759,795 | Archer | Aug. 21, 1956 |